(12) United States Patent
Cabello et al.

(10) Patent No.: US 10,250,330 B1
(45) Date of Patent: Apr. 2, 2019

(54) FLEXIBLE SIGNAL DISTRIBUTION ASSISTED BY TUNABLE OPTICAL CARRIER MODULATING A DESIRED SIGNAL

(71) Applicant: Space Systems/Loral, LLC, Palo Alto, CA (US)

(72) Inventors: Silvia M. Delgado Cabello, Palo Alto, CA (US); Vijaya Gallagher, Palo Alto, CA (US); Ghislain Turgeon, San Jose, CA (US)

(73) Assignee: Space Systems/Loral LLC, Palo Alto, CA (US)

( * ) Notice: Subject to any disclaimer, the term of this patent is extended or adjusted under 35 U.S.C. 154(b) by 0 days.

(21) Appl. No.: 15/904,063

(22) Filed: Feb. 23, 2018

(51) Int. Cl.
| | |
|---|---|
| H04J 14/00 | (2006.01) |
| H04B 10/118 | (2013.01) |
| H04J 14/02 | (2006.01) |
| H04Q 11/00 | (2006.01) |
| H04B 7/185 | (2006.01) |

(52) U.S. Cl.
CPC ....... *H04B 10/118* (2013.01); *H04B 7/18513* (2013.01); *H04J 14/0212* (2013.01); *H04Q 11/0005* (2013.01); *H04Q 11/0066* (2013.01); *H04B 2210/006* (2013.01); *H04Q 2011/0016* (2013.01); *H04Q 2011/0018* (2013.01)

(58) Field of Classification Search
CPC .............. H04B 10/118; H04B 7/18513; H04B 2210/006; H04Q 11/0005; H04Q 11/0066; H04Q 2011/0018; H04Q 2011/0016; H04J 14/0212
USPC ........................................................ 398/48
See application file for complete search history.

(56) References Cited

U.S. PATENT DOCUMENTS

| | | | |
|---|---|---|---|
| 4,468,766 A | 8/1984 | Spezio | |
| 5,870,216 A * | 2/1999 | Brock | ................ H04B 7/18504 398/121 |
| 7,245,833 B1 * | 7/2007 | Volkening | .......... H04B 10/2575 398/116 |

(Continued)

OTHER PUBLICATIONS

Chen et al., "RF Photonic Front-End Integrating with Local Oscillator Loop", Feb. 24, 2014, vol. 22, No. 4, Optics Express, pp. 3918-3923.

(Continued)

*Primary Examiner* — Don N Vo
(74) *Attorney, Agent, or Firm* — Vierra Magen Marcus LLP

(57) ABSTRACT

A photonic switch device accepts a data modulated RF signal and outputs the data modulated RF signal or a frequency converted version thereof at one or more outputs of the switch device. Tunable laser(s) is/are controlled to cause peak wavelength(s) of the optical signal(s) emitted therefrom. An EOM receives the accepted data modulated RF signal and optical signal(s) produced using the tunable laser(s), and the EOM outputs an optical data signal modulated to include the data modulated RF signal. A WDM receives the optical data signal output by the EOM and the optical data signal received by the WDM demultiplexer is output at one or more outputs thereof based on peak wavelength(s) of the optical data signal. Photodetectors optically coupled to respective outputs of the WDM demultiplexer convert optical signals back to electrical signals. Related methods and system are also described herein.

20 Claims, 8 Drawing Sheets

(56) References Cited

U.S. PATENT DOCUMENTS

| | | | |
|---|---|---|---|
| 8,508,723 B2 * | 8/2013 | Chang | G01S 17/87 |
| | | | 356/28 |
| 9,335,568 B1 * | 5/2016 | Yap | G02F 1/011 |
| 9,680,576 B1 * | 6/2017 | Middleton | H04B 10/40 |

OTHER PUBLICATIONS

Yu et al., "Simple Photonic-Assisted Radio Frequency Down-Converter Based on Optoelectronic Oscillator", Aug. 2014, Photon. Res. 2, B1-B4.

* cited by examiner

FLEXIBLE SIGNAL DISTRIBUTION ASSISTED BY TUNABLE OPTICAL CARRIER MODULATING A DESIRED SIGNAL

BACKGROUND

Wireless communication systems, such as a satellite communication system, often need to share (non-simultaneously in time) a common single access to a communication node, which can be a satellite or terrestrial node, and distribute to different output accesses respectively those signals. An example and particular application on this broader principle is the implementation of satellite beam hoping.

DETAILED DESCRIPTION

Figure 1:
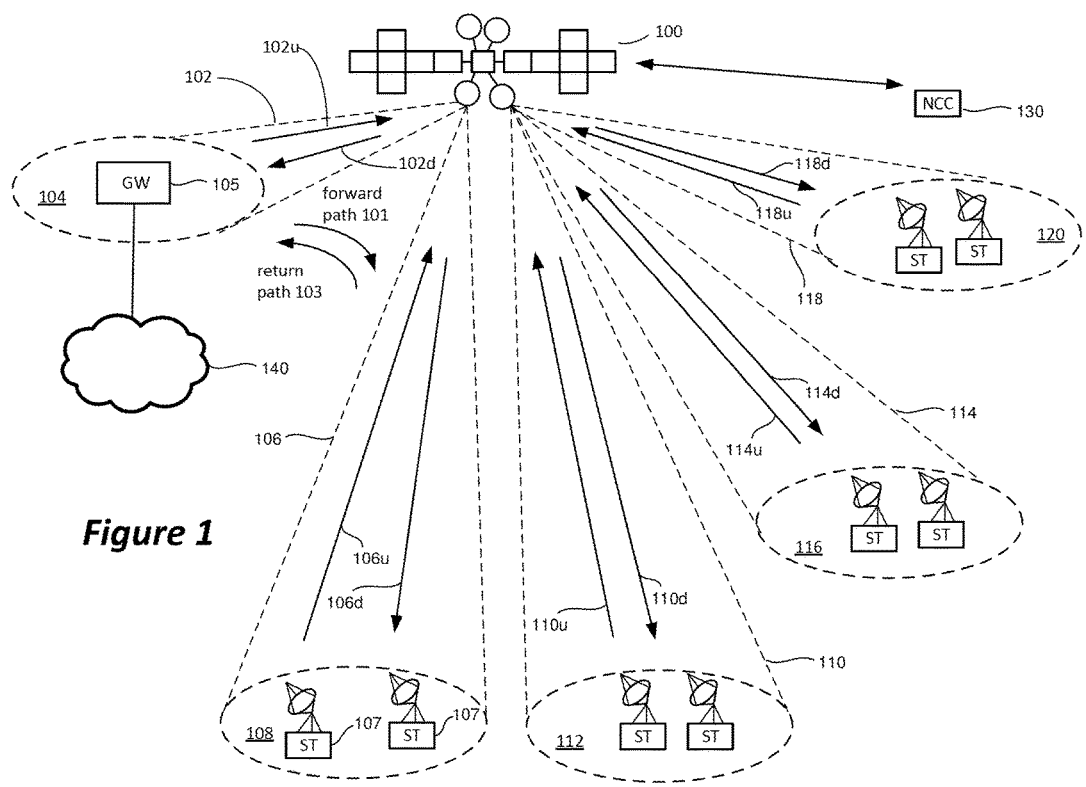
FIG. 1 is a block diagram of an exemplary wireless communication system, which may be a satellite communication system.

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout. In addition, the first digit of a reference number identifies the drawing in which the reference number first appears.

Certain embodiments of the present technology described herein relate photonic switch devices, and related methods, which can be used to accept a data modulated RF signal and output the data modulated RF signal, or a frequency converted version of the data modulated RF signal, at one or more of a plurality of outputs of the switch device. Beneficially, such switch devices can be used to perform switching functions without performing digital switching using transistors or the like. Rather, such embodiments, as will be appreciated from the description below, convert the data modulate RF signal from an electrical signal to an optical signal, perform switching in the optical domain using one or more tunable lasers and a wavelength divisional multiplexing (WDM) demultiplexer, and then convert the optical signal back to an electrical signal that it output at one or more outputs of a switch device. While not limited thereto, such embodiments are especially useful for performing switching in a wireless communication system. For example, the photonic switch devices described here can enable power reduction in an overall system by allowing rapid beam hopping over geographically dispersed beams, and allowing such beams to share a limited amount of power. Accordingly, prior to describing further details of specific embodiments of the present technology, it is first useful to describe an exemplary wireless communication system with which embodiments of the present technology would be useful. An example of such a wireless communication system will now be described with reference to FIG. 1.

FIG. 1 depicts a block diagram of a wireless communications system that includes a communication platform 100, which may be a satellite located, for example, at a geostationary or non-geostationary orbital location. In other embodiments, other platforms may be used such as an unmanned aerial vehicle (UAV) or balloon, or even a ship for submerged subscribers. In yet another embodiment, the subscribers may be air vehicles and the platform may be a ship or a truck where the "uplink" and "downlink" in the following paragraphs are reversed in geometric relations. Platform 100 may be communicatively coupled to at least one gateway (GW) 105 and a plurality of subscriber terminals ST (including subscriber terminals 107). The term subscriber terminals may be used to refer to a single subscriber terminal or multiple subscriber terminals. A subscriber terminal ST is adapted for communication with the wireless communication platform 100, which as noted above, may be a satellite. Subscriber terminals may include fixed and mobile subscriber terminals including, but not limited to, a cellular telephone, a wireless handset, a wireless modem, a data transceiver, a paging or position determination receiver, or mobile radio-telephone, or a headend of an isolated local network. A subscriber terminal may be handheld, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, or a mobile. Where the communication platform of a wireless communication system is a satellite, the wireless communication system can be referred to more specifically as a satellite communication system. For the remainder of this description, unless stated otherwise, it is assumed that the communication platform 100 is a satellite. Accordingly, platform 100 will often be referred to as satellite 100, and the wireless communication system will often be referred to as a satellite communication system.

In one embodiment, satellite 100 comprises a bus (e.g., spacecraft) and one or more payloads (e.g., the communication payload). The satellite will also include multiple power sources, such as batteries, solar panels, and one or more propulsion systems, for operating the bus and the payload.

The at least one gateway 105 may be coupled to a network 140 such as, for example, the Internet, terrestrial public switched telephone network, mobile telephone network, or a private server network, etc. Gateway 105 and the satellite (or platform) 100 communicate over a feeder beam 102, which has both a feeder uplink 102*u* and a feeder downlink 102*d*. In certain embodiments, a feeder downlink beam 102*d* is a spot beam to illuminate a region 104 on the Earth's surface (or another surface). Gateway 105 is located in region 104 and communicates with satellite 100 via feeder beam 102. Although a single gateway is shown, some implementations will include many gateways, such as five, ten, or more. One embodiment includes only one gateway. Each gateway may utilize its own feeder beam, although more than one gateway can be positioned within a feeder beam. In one embodiment, a gateway is located in the same spot beam as one or more subscriber terminals.

Subscriber terminals ST and satellite 100 communicate over service beams, which are also known as user beams. For example, FIG. 1 shows service beams 106, 110, 114 and 118 for illuminating regions 108, 112, 116 and 120, respectively. In many embodiments, the communication system will include more than four service beams (e.g., sixty, one hundred, etc.). Each of the service beams have an uplink (106*u*, 110*u*, 114*u*, 118*u*) and a downlink (106*d*, 110*d*, 114*d*, 118*d*) for communication between subscriber terminals ST and satellite 100. Although FIG. 1 only shows two subscriber terminals within each region 108, 112, 116 and 120, a typical system may have thousands of subscriber terminals within each region.

In one embodiment, communication within the system of FIG. 1 follows a nominal roundtrip direction whereby data is received by gateway 105 from network 140 (e.g., the Internet) and transmitted over the forward path 101 to a set of subscriber terminals ST. In one example, communication over the forward path 101 comprises transmitting the data from gateway 105 to satellite 100 via uplink 102*u* of feeder beam 102, through a first signal path on satellite 100, and from satellite 100 to one or more subscriber terminals ST via downlink 106*d* of service beam 106. An uplink (e.g., 102*u*) of a feeder beam (e.g., 102) can also be referred to more succinctly as a feeder uplink beam, and the downlink (e.g., 106*d*) of a service beam (e.g., a 106) can also be referred to more succinctly as a service downlink beam. Although the above example mentions service beam 106, the example could have used other service beams.

Data can also be sent from the subscriber terminals STs over the return path 103 to gateway 105. In one example, communication over the return path comprises transmitting the data from a subscriber terminal (e.g., subscriber terminal 107 in service beam 106) to satellite 100 via uplink 106*u* of service beam 106, through a second signal path on satellite 100, and from satellite 100 to gateway 105 via downlink 102*d* of feeder beam 102. An uplink (e.g., 106*u*) of a service beam (e.g., 106) can also be referred to more succinctly as a service uplink beam, and the downlink 102*d* of feeder beam 102 can also be referred to more succinctly as a feeder downlink beam. Although the above example uses service beam 106, the example could have used any service beam.

FIG. 1 also shows a Network Control Center (NCC) 130, which can include an antenna and modem for communicating with satellite 100, as well as one or more processors and data storage units. Network Control Center 130 provides commands to control and operate satellite 100. Network Control Center 130 may also provide commands to any of the gateways and/or subscriber terminals.

In one embodiment, communication platform 100 implements the technology described below. In other embodiments, the technology described below is implemented on a different platform (or different type of satellite) in a different communication system. For examples, the communication platform can alternatively be a UAV or balloon, but is not limited thereto.

The architecture of FIG. 1 is provided by way of example and not limitation. Embodiments of the disclosed technology may be practiced using numerous alternative implementations.

Figure 2:
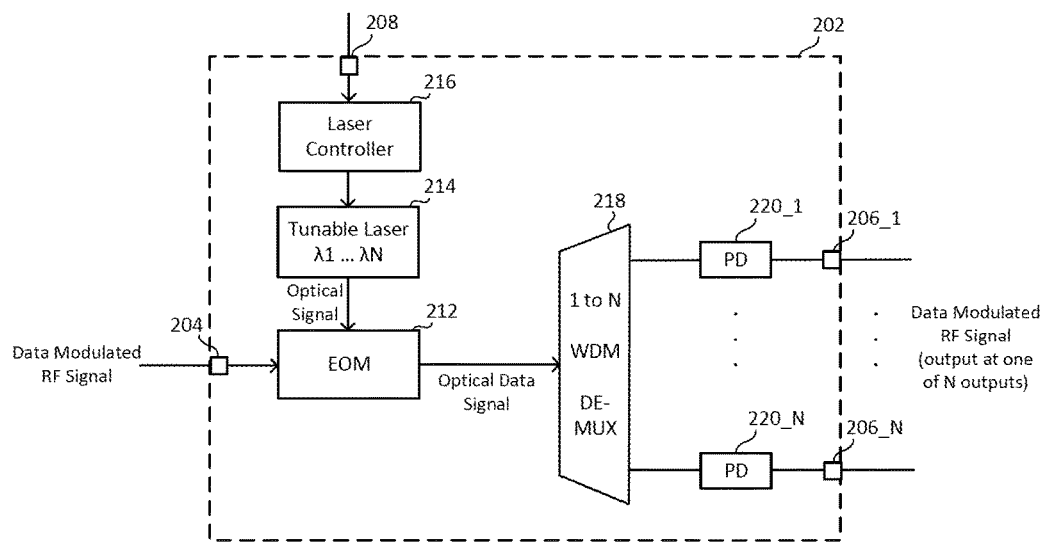
FIG. 2 illustrates a photonic switch device according to an embodiment of the present technology, which can be used in a wireless communication system, but is not limited thereto.

FIG. 2 illustrates a switch device 202 according to an embodiment of the present technology. Referring to FIG. 2, the switch device 202 is shown as including one RF input 204, at which is received a data modulated radio frequency (RF) signal, and N (i.e., a plurality of) RF outputs 206_1 . . . 206_N. Since the data modulated RF signal that is provided to the input 204 of the switch device 202 is an electrical signal, as opposed to an optical signal, the data modulated RF signal provided to the input 204 may also be referred to herein as a data modulated RF electrical signal. The data modulated RF signal, provided to the RF input 204, may have already have been time divisional multiplexed (TMD) and/or frequency division multiplexed (FDM) so that the data modulated RF signal includes data for multiple end users, e.g., multiple different subscriber terminal STs. The time division multiplexing can be performed by a time division multiplexer (not shown in FIG. 2) that is upstream of the switch device 202 and can be used to implement a beam hopping scheme. The frequency division multiplexing can be performed by a frequency division multiplexer (not shown in FIG. 2) that is upstream of the switch device 202. Exemplary details of a frequency division multiplexer are shown and described below with reference to FIG. 5B. As will be appreciated from the discussion below, the switch device 202 can be controlled to output the data modulated RF signal (received at the input 204) at any one of the N outputs 206_1 . . . 206_N, where N is an integer that is greater than or equal to two. Accordingly, the switch device 202 can be referred to as a 1-to-N switch device. Further, since the switch device 202 converts an electrical RF signal to an optical signal, and then back to an electrical RF signal, the switch device 202 can be referred to more specifically as a photonic switch device 202, and even more specifically as a 1-to-N photonic switch device 202. The switch device 202 is also shown as including a control input 208, at which can be received a switch control signal, e.g., from a higher level controller (not shown).

As shown in FIG. 2, the switch device 202 is shown as including an electro-optical modulator (EOM) 212, a tunable laser 214, a laser controller 216, a 1-to-N wavelength-division multiplexing (WDM) demultiplexer (DEMUX) 218, and N photodetectors (PDs) 220_1 . . . 220_N. These elements of the switch device 202 are described below.

The tunable laser 214 is operable to emit an optical signal having a peak optical wavelength within a specified wavelength range, e.g., from 1510 to 1540 nm, but not limited thereto. The laser controller 216 controls the tunable laser 214 to cause the peak optical wavelength of the optical signal emitted by the tunable laser 214 to be one of N different wavelengths. For example, if N equals 4, then the laser controller 216 may control the tunable laser 214 to cause the peak optical wavelength of the optical signal emitted by the tunable laser 214 to be one of 1510 nm, 1520 nm, 1530 nm, or 1540 nm. The laser controller 216 can be controlled by a switch control signal received at the control input 208 of the switch device 202, as noted above. The optical signal that is output by the tunable laser 214, and other tunable lasers discussed herein, can also be referred to as a tunable optical carrier.

The tunable laser 214 can be implemented in various different manners, depending upon implementation. For example, the tunable laser 214 can be implemented as a sampled-grating distributed Bragg reflector (SG-DBR) laser that uses one or more tunable Bragg mirrors and a phase section to achieve a single mode output range of greater then 50 nm. The tunable laser 214 can alternatively be implemented as an external cavity laser that uses a MEMS structure for tuning the cavity length, or as an external cavity laser that uses multiple-prism grating arrangements for wide-range tunability. In still another embodiment, the tunable laser 214 can be implemented as a distributed feedback (DFB) laser array based on several thermal tuned DFB lasers, in which case coarse tuning can be achieved by selecting a correct laser bar, and if desired, fine tuning can be done thermally. For still another example, the tunable laser 214 can be implemented as a tunable vertical-cavity surface-emitting laser (VCSEL). These are just a few examples of the types of tunable lasers that can be used to implement the tunable laser 214, which are not intended to be all encompassing. The specific implementation of the laser controller 216 will depend upon what type of tunable laser 214 that is used, as would be appreciated by one of ordinary skill in the art. While the tunable laser 214 and the laser controller 216 are shown in FIG. 2 as two separate blocks, and are described herein as two separate elements, it is also within the scope of the embodiments described herein for the tunable laser 214 and the laser controller 216 to be combined into a single element or package that performs the functions of both the tunable laser 214 and the laser controller 216.

The EOM 212 includes two inputs at which are respectively received the data modulated RF signal (accepted at the RF input 204 of the switch device 202) and the optical signal emitted by the tunable laser 214. The peak optical wavelength of the optical signal that the EOM 212 receives from the tunable laser 214 depends on (i.e., is based on) how the laser controller 216 controls the tunable laser 214. For an example, based on how the laser controller 216 controls the tunable laser 214, the peak optical wavelength of the optical signal that the EOM 212 receives from the tunable laser 214 can be 1510 nm, 1520 nm, 1530 nm, or 1540 nm. In response to receiving the data modulated RF signal, and receiving the optical signal (from the tunable laser 214), the EOM 212 outputs an optical data signal that has been modulated to include the data modulated RF signal. The optical data signal that is output by the EOM 212 will have one of the N different optical wavelengths, based on how the laser controller 216 controls the tunable laser 214. For example, when the laser controller 216 is controlled to emit an optical signal having a peak optical wavelength of 1510 nm, the optical data signal that is output by the EOM will have a peak optical wavelength of 1510 nm. For another example, when the laser controller 216 is controlled to emit an optical signal having a peak optical wavelength of 1530 nm, the optical data signal that is output by the EOM 212 will have a peak optical wavelength of 1530 nm.

The modulation performed by the EOM 212 may be imposed on the phase, frequency, amplitude, or polarization of a beam of light, or any combination thereof. In accordance with a specific embodiment, each of the EOMs 212 is a phase modulating EOM that is used as an amplitude modulator by using a Mach-Zehnder interferometer. In other words, each of the EOMs 212 can be implemented as a Mach-Zehnder modulator (MZM), which can be a Lithium Niobate Mach-Zehnder modulator, but is not limited thereto. In accordance with specific embodiments, each of the EOMs 212 is implemented as an MZM that produces an amplitude modulated (AM) optical waveform with a modulation index between 10% and 80% in order to maintain fidelity of an RF waveform (modulated therein) without too much distortion. The optical signal that is output by the EOM 212 can be referred to as an optical data signal. The modulation scheme that is implemented by the EOM 212 can result in double- or vestigial-sidebands, including both an upper sideband (USB) and a lower sideband (LSB). Alternatively, single-sideband modulation (SSB) can be utilized to increase bandwidth and transmission power efficiency.

The optical data signal that is output by the EOM 212 (which has one of the N peak optical wavelengths, as controlled by the laser controller 216) is provided to the input of the 1-to-N WDM DEMUX 218. The 1-to-N WDM DEMUX 218 will output, at one of its N outputs, the optical data signal that is received at its input. The specific output of the 1-to-N WDM DEMUX 218, at which the optical data signal will be output, depends on (i.e., is based on) the peak optical wavelength of the optical data signal that is provided to the input of the WDM DEMUX 218. For example, when the optical data signal provided to the input of the WDM DEMUX 218 has a first peak optical wavelength (e.g., 1510 nm), then optical data signal will be output at a first output (e.g., 206_1) of the WDM DEMUX 218; when the optical data signal provided to the input of the WDM DEMUX 218 has a second peak optical wavelength (e.g., 1520 nm), then optical data signal will be output at a second output of the WDM DEMUX 218; when the optical data signal provided to the input of the WDM DEMUX 218 has a third peak optical wavelength (e.g., 1530 nm), the optical data signal will be output at a third output of the WDM DEMUX 218; and when the optical data signal provided to the input of the WDM DEMUX 218 has a fourth peak optical wavelength (e.g., 1540 nm), the optical data signal will be output at a fourth output of the WDM DEMUX 218. More generally, at any given time the optical data signal that is received at the input of the WDM DEMUX 218 will be output at one of the N outputs of the WDM DEMUX 218 based on the peak optical wavelength of the optical data signal, which is based on how the laser controller 216 controls the tunable laser 214.

In accordance with certain embodiments of the present technology, WDM DEMUX 218 may be implemented as an arrayed waveguide grating (AWG), which can be built as a planar lightwave circuit, where the light coming from an input first enters a multimode waveguide section, then propagates through several single-mode waveguides to a second multimode section, and finally into the outputs. Wavelength filtering can be based on an interference effect and the different optical path lengths in the single-mode waveguides. Any frequency component of the input propagates through all single-mode waveguides, and the output in any channel results from the superposition (interference) of all these contributions. Wavelength-dependent phase shifts lead to a wavelength-dependent overall throughput for any combination of an input port and an output port. Instead of implementing the WDM DEMUX 218 as an AWG, the WDM DEMUX 218 can alternatively be implemented in other manners. For example, in other embodiments the WDM DEMUX 218 can be a ring-resonator based WDM DEMUX 218 or an interferometer based WDM DEMUX 218, but is not limited thereto.

Each of the N outputs of the 1-to-N WDM DEMUX 218 is optically coupled to a respective one of the N photodetectors (PDs) 220_1 . . . 220_N. The PDs 220_1 . . . 220_N can be referred to collectively as the PDs 220, or individually as a PD 220. Each of the PDs 220 provides or is electrically coupled to one of the N outputs 206_1 . . . 206_N of the switch device 202. Each PD 220 converts the optical signal it receives from the WDM DEMUX 218 to a respective RF electrical signal. For example, when the PD 220_1 receives an optical data signal from the first output of the WDM DEMUX 218, the PD 220_1 converts the optical signal back to a data modulated RF electrical signal that is output at the output 206_1 of the switch device 202; . . . when the PD 220_N receives an optical data signal from the Nth output of the WDM DEMUX 218, the PD 220_N converts the optical signal back to a data modulated RF electrical signal that is output at the output 206_N of the switch device 202. More generally, at any given time the data modulated RF signal that is provided to the input 204 of the switch device 202 will be output at one of the N outputs 206 of the switch device 202 based on how the laser controller 216 controls the tunable laser 214.

In FIG. 2, the data modulated RF electrical signal produced by a PD 220 is shown as being provided directly to a respective output 206 of the switch device 202. It is also within the scope of the embodiments described herein that a respective filter (FTR) (e.g., a bandpass filter, not shown in FIG. 2) can be located between each PD 220 and a respective switch device output 206. Alternatively, such filters can be external to the switch device 202, e.g., downstream of the outputs 206 of the switch device 202. The switch device 202 can be made faster and lighter than a mechanical switch, an electrical switch, and an electro-mechanical switch. For example, the switch device 202 can be switched at a rate of a tens of nanoseconds, where as a conventional mechanical switch is typically limited to be switched at a rate of tens of milliseconds.

In the embodiment of FIG. 2, the frequency of the RF signal output at one of the N outputs 206 of the switch device 202 will be the same as the frequency of the data modulated RF signal received at the input 204 of the switch device 202. In another embodiment of the present technology, described below with reference to FIG. 3, a photonic switch device 303, in addition to providing a 1-to-N switching capability, can simultaneously perform frequency conversion (i.e., a frequency up-conversion, or a frequency down-conversion), so that the RF frequency of the RF signal output at one of the N outputs 306 of the switch device 302 will be different than the frequency of the RF signal received at the input 304 of the switch device 302.

Figure 3:
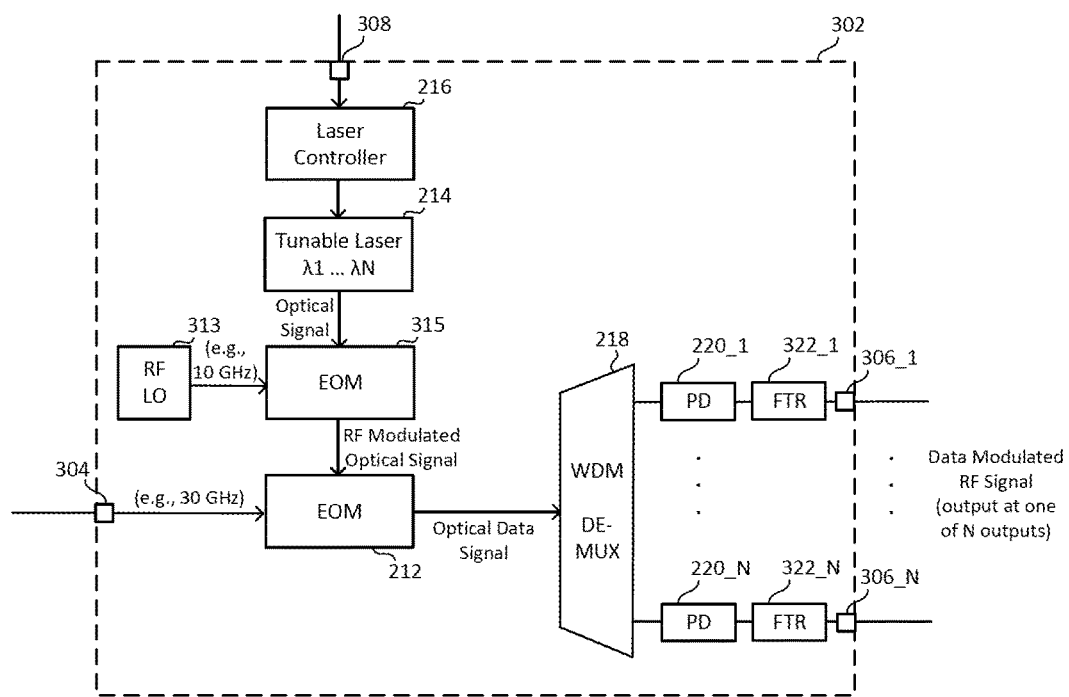
FIG. 3 illustrates a photonic switch device according to another embodiment of the present technology.

As noted above, FIG. 3 illustrates a switch device 302 according to another embodiment of the present technology, which can also be referred to more specifically as a photonic switch device 302, or even more specifically as a frequency converting photonic switch device 302. Where elements in FIG. 3 are the same as those already described above with reference to FIG. 2, the same reference numbers that were used in FIG. 2 will be used in FIG. 3, and the elements (that were already described above with reference to FIG. 2) need not be described again with the same level of detail. Referring to FIG. 3, the switch device 302 is shown as including one RF input 304, at which is received a data modulated RF signal, and N RF outputs 306_1 . . . 306_N. As will be appreciated from the discussion below, the switch device 302 can be controlled to output a frequency converted version of the data modulated RF electrical signal (received at the input 304) at any one of the N outputs 306_1 . . . 306_N, where N is an integer that is greater than or equal to two. Accordingly, the switch device 302 can be referred to as a 1-to-N switch device. Further, since the switch device 302 converts an electrical RF signal to an optical signal, and then back to an electrical RF signal, the switch device 302 can be referred to more specifically as a photonic switch device 302, and even more specifically as a 1-to-N photonic switch device 302. The switch device 302 is also shown as including a control input 308, at which can be received a switch control signal, e.g., from a higher level controller (not shown).

Still referring to FIG. 3, the switch device 302 is shown as including an EOM 212, a tunable laser 214, a laser controller 216, a 1-to-N WDM DEMUX 218, and N photodetectors (PDs) 220_1 . . . 220_N, each of which were also shown as being included in the switch device 202 described above with reference to FIG. 2. Additionally, the switch device 302 is shown as including a further EOM 315 and an RF local oscillator (LO) 313, which elements were not included in the switch device 202 described above with reference to FIG. 2.

As was described above with reference to FIG. 2, the tunable laser 214 is operable to emit an optical signal having a peak optical wavelength within a specified wavelength range, e.g., from 1510 to 1540 nm, but not limited thereto. In FIG. 3, the optical signal that is output by the tunable laser 214 is provided to the further EOM 315, which also receives an RF carrier signal from the RF LO 313. For example, assume that RF carrier signal that is output by the RF LO 313 has an RF frequency of 10 GHz.

The EOM 315 includes two inputs at which are respectively received the RF carrier signal (output by the RF LO 313) and the optical signal emitted by the tunable laser 214. The peak optical wavelength of the optical signal that the EOM 315 receives from the tunable laser 214 depends on (i.e., is based on) how the laser controller 216 controls the tunable laser 214. For an example, based on how the laser controller 216 controls the tunable laser 214, the peak optical wavelength of the optical signal that the EOM 315 receives from the tunable laser 214 can be 1510 nm, 1520 nm, 1530 nm, or 1540 nm. In response to receiving the RF carrier signal (from the RF LO 313), and receiving the optical signal (from the tunable laser 214), the EOM 315 outputs an optical signal that has been modulated to include the RF carrier signal output by the RF LO 313, and thus, can be referred to as an RF modulated optical signal. The RF modulated optical signal that is output by the EOM 315 is provided to one of the inputs of the EOM 212, while the other input of the EOM 212 receives the data modulated RF signal (that is received at an input 304 of the switch device 302).

The EOM 212 includes two inputs at which are respectively received the data modulated RF signal (received via the input 304) and the RF modulated optical signal (output by the EOM 315), as noted above. The peak optical wavelength of the RF modulated optical signal that the EOM 212 receives from the EOM 315 depends on (i.e., is based on) how the laser controller 216 controls the tunable laser 214, as was explained above. For example, assume that the peak optical wavelength of the RF modulated optical signal that the EOM 212 receives from the tunable laser 214 is 1520 nm. The optical signal that is output by the EOM 212, which can also be referred to as an optical data signal, is modulated by both the RF carrier signal that is output by the RF LO 313 (e.g., 10 GHz) and the RF frequency of the RF data modulated signal that is received at an input 304 of the switch device 302 (e.g., having a center frequency of 30 GHz) as well as mixing products of the 10 GHz and the 30 GHz RF signals, which would include RF signals in the 20 GHz range. Thus in this example the optical data signal output by the EOM 212 would have 20 GHz RF sidebands on the 1520 nm optical signal, which are the signals of interest in typical Ka band satellite applications (as well as other RF mixing products that will be filtered out by the FTRs 322_1, 322_2 . . . 322_N as described below). The optical data signal that is output by the EOM 212 is provided to the WDM DEMUX 218.

The 1-to-N WDM DEMUX 218 will output, at one of its N outputs, the optical data signal that is received at its input. The specific output of the 1-to-N WDM DEMUX 218, at which the optical data signal will be output, depends on (i.e., is based on) the peak optical wavelength of the optical data signal. For an example, when the optical data signal provided to the input of the WDM DEMUX 218 has a first peak optical wavelength (e.g., 1510 nm), then optical data signal will be output at a first output (e.g., 306_1) of the WDM DEMUX 218; when the optical data signal provided to the input of the WDM DEMUX 218 has a second peak optical wavelength (e.g., 1520 nm), then optical data signal will be output at a second output of the WDM DEMUX 218; when the optical data signal provided to the input of the WDM DEMUX 218 has a third peak optical wavelength (e.g., 1530 nm), the optical data signal will be output at a third output of the WDM DEMUX 218; and when the optical data signal provided to the input of the WDM DEMUX 218 has a fourth peak optical wavelength (e.g., 1540 nm), the optical data signal will be output at a fourth output of the WDM DEMUX 218. More generally, at any given time the optical data signal that is received at the input of the WDM DEMUX 218 will be output at one of the N outputs of the WDM DEMUX 218 based on the peak optical wavelength of the optical data signal, which is based on how the laser controller 216 controls the tunable laser 214.

Each of the N outputs of the 1-to-N WDM DEMUX 218 is optically coupled to a respective one of the PDs 220_1 . . . 220_N, which can be referred to collectively as the PDs 220 or individually as a PD 220. Each PD 220 converts the optical data signal it receives from the WDM DEMUX 218 to a respective RF electrical signal, and also performs frequency up-conversion and frequency down-conversion. For example, when the PD 220_1 receives an optical data signal from the first output of the WDM DEMUX 218, the PD 220_1 converts the optical signal back to an RF electrical signal having RF frequencies equal the center frequency of the data modulated RF signal provided to the input 304 of the switch (e.g., 30 GHz) plus and minus (i.e., +/−) the frequency of the RF LO (e.g., 10 GHz). Accordingly, in this example, the RF signal produced by the PD 220_1 can have an RF frequency of 30 GHz+10 GHz (i.e., 40 GHz) and an RF frequency of 30 GHz-10 GHz (i.e., 20 GHz), and one of the two RF frequencies would be filtered out using the filter (FTR) 322_1 that is coupled between the PD 220_1 and the output 306_1 of the switch device 302. For example, where the desire is to down-convert the data modulated RF signal (provided to the input 304 of the switch device 302) from 30 GHz to 20 GHz, the FTR 322_1 can be a lowpass filter (LPF) or bandpass filter (BPF) that filters out the 40 GHz frequency component of the RF signal produced by the PD 220_1, in which case the data modulated RF electrical signal output at the output port 306_1 of the switch device 302 will have a center frequency of 20 GHz. For another example, where the desire is to up-convert the data modulated RF signal (provided to the input 304 of the switch device 302) from 30 GHz to 40 GHz, the FTR 322_1 can be a highpass filter (HPF) or bandpass filter (BPF) that filters out the 20 GHz frequency component of the data modulated RF electrical signal produced by the PD 220_1, in which case the RF signal output at the output port 306_1 of the switch device will have a center frequency of 40 GHz.

The frequency converted data modulated RF signal will be output at one of the N outputs 306 of the switch device 302, based on the optical wavelength produced by the tunable laser 214, which is based on how the laser controller 216 controls the tunable laser 214. For an example, when the laser controller 216 is controlled to emit an optical signal having a peak optical wavelength of 1510 nm, the frequency converted data modulated RF signal can be output at the output 306_1; when the laser controller 216 is controlled to emit an optical signal having a peak optical wavelength of 1520 nm, the frequency converted data modulated RF signal will be output at the output 306_2 (not shown); etc.

In accordance with certain embodiments of the present technology, the switch devices disclosed herein (e.g., the switch devices 202 or 302 discussed above, or the switch device 402 discussed below) can be included within a satellite to enable onboard switching of RF signals, and if desired, frequency conversion. For example, the switch device 302 in FIG. 3 can be used to selectively provide a data modulated RF signal (provided to the input 304 of the switch device 302) to any one of N different output paths or channels of the satellite, each of which may include a respective antenna element for transmitting a service downlink beam to a service terminal ST. The switch device 302 can also be used to frequency convert (e.g., frequency down-convert from 30 GHz to 20 GHz, but not limited thereto) a data modulated RF signal from a frequency range used by a gateway to transmit a feeder uplink signal to a satellite, to a frequency range used by the satellite to transmit a service downlink beam to a service terminal ST. The data modulated RF signal provided to the input 304 of the switch device 302 (or to an input of one of the other switch devices disclosed herein) can include data for a single service terminal ST. Alternatively, the data modulated RF signal provided to the input of the switch device 302 (or to an input of one of the other switch devices disclosed herein) can include data for multiple service terminals STs, e.g., using frequency division multiplexing. In other words, the data modulated RF signal provided to an input of one of the switch devices described herein can be a frequency division multiplexed signal that includes data for multiple service terminals STs.

In the embodiment of FIG. 3, a frequency converted data modulated RF signal is output at only one of the N outputs 306 at a time. In another embodiment of the present technology, described below with reference to FIG. 4, a frequency converted data modulated RF signal can be output at multiple outputs (four-of-eight outputs in the example in FIG. 4) of a switch device 402.

Figure 4:
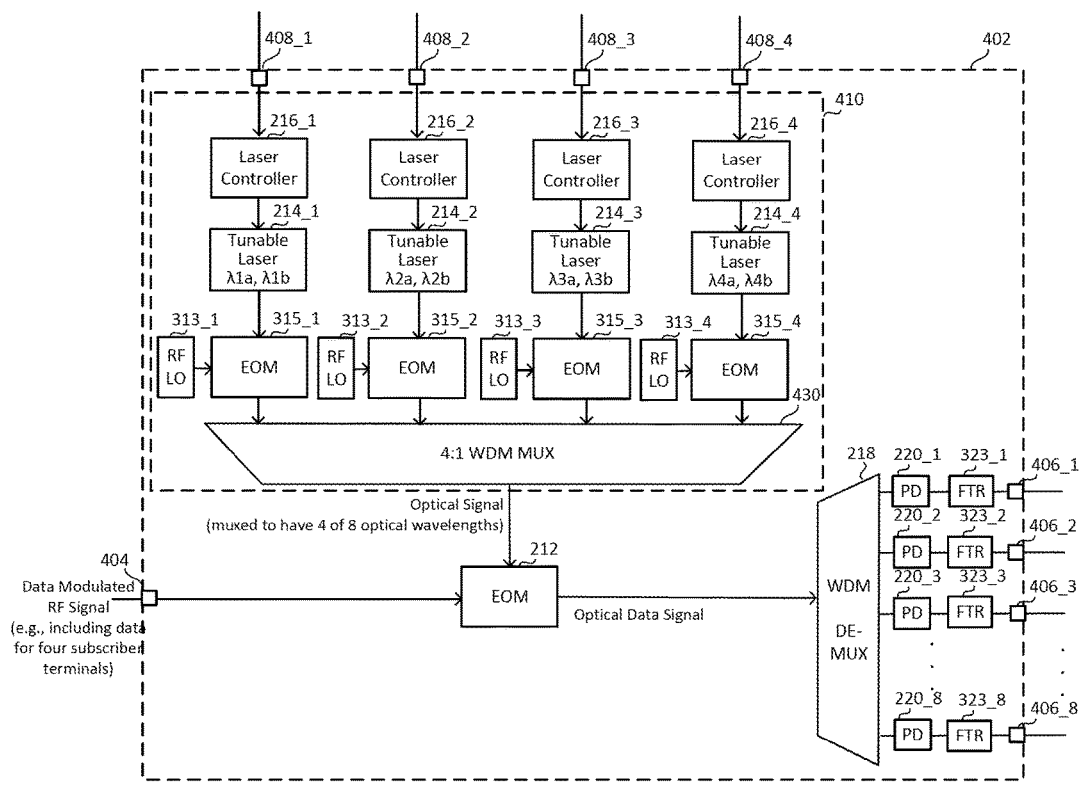
FIG. 4 illustrates a photonic switch device according to still another embodiment of the present technology.

As noted above, FIG. 4 illustrates a switch device 402 according to another embodiment of the present technology, which can also be referred to more specifically as a photonic switch device 402, or even more specifically as a multi-output frequency converting photonic switch device 402. Where elements in FIG. 4 are the same as those already described above with reference to FIG. 2 and/or FIG. 3, the same reference numbers that were used in FIG. 2 and/or FIG. 3 will be used in FIG. 4, and the elements (that were already described above with reference to FIG. 2 and/or FIG. 3) need not be described again with the same level of detail. Referring to FIG. 4, the switch device 402 is shown as including one RF input 404, at which is received a data modulated RF signal, and a plurality of RF outputs 406_1, 408_2 . . . 406_8, which can be referred to collectively as the outputs 406, or individually as an output 406. While shown as including eight outputs in FIG. 4, such a switch device 402 can more generally include N outputs, where N is an integer this is greater than or equal to two. The switch device 402 is also shown as including a plurality of control inputs 408_1, 408_2, 408_3 and 408_4, which can be referred to collectively as the control inputs 408, or individually as a control input 408. While shown as including four control inputs 408, the switch device 402 can include more or less control inputs, depending on various factors, including how many tunable lasers 214 are included in the switch device 402. It would also be possible that the controllers 216_1 . . . 216_4 be implemented as a single controller 216 that controls multiple tunable lasers 214.

As shown in FIG. 4, the switch device 402 is shown as including an EOM 212, a WDM DEMUX 218, and PDs 220_1 . . . 220_8, and FTRs 323_1 . . . 323_8, instances of each of which were also shown as being included in the switch device 302 described above with reference to FIG. 3. The switch device 402 is also shown as including laser controllers 216_1 . . . 216_4, tunable lasers 214_1 . . . 214_4, EOMs 315_1 . . . 315_4, RF LOs 313_1 . . . 315_4, and a WDM multiplexer (MUX) 430. In the embodiment shown in FIG. 4, each of the tunable lasers is controlled to output an optical signal having one of two different peak optical wavelengths. For example, the tunable laser 214_1 can be controlled to output an optical signal having a peak optical wavelength of either kla or klb (e.g., 1510 nm or 1515 nm), the tunable laser 214_2 can be controlled to output an optical signal having a peak optical wavelength of either k2a or k2b (e.g., 1520 nm or 1525 nm), the tunable laser 214_3 can be controlled to output an optical signal having a peak optical wavelength of either $\lambda 3a$ or $\lambda 3b$ (e.g., 1530 nm or 1535 nm), and the tunable laser 214_4 can be controlled to output an optical signal having a peak optical wavelength of either $\lambda 4a$ or $\lambda 4b$ (e.g., 1540 nm or 1545 nm). Each of the tunable lasers 214 is controlled by a respective one of the laser controllers 216, which receives a control signal from a respective one of the control inputs 408.

The optical signal that is output by each of the the tunable lasers 214 is provided to a respective one of the EOMs 315, each of which also receives an RF carrier signal from a respective one of the RF LOs 313. The RF carriers signals output by the RF LOs 313 can differ from one another. For an example, that RF carrier signal that is output by the RF LO 313_1 can have an RF frequency of 10.0 GHz, the RF carrier signal this is output by the RF LO 313_2 can have an RF frequency of 10.2 GHz, the RF carrier signal this is output by the RF LO 313_2 can have an RF frequency of 10.4 GHz, and the RF carrier signal this is output by the RF LO 313_2 can have an RF frequency of 10.6 GHz. Each of the EOMs 315 includes two inputs at which are received an RF carrier signal (output by a respective one of the RF LOs 313) and an optical signal emitted by a respective one of the tunable lasers 214. The peak optical wavelength of the optical signal that each of the EOMs 315 receives from one of the tunable lasers 214 depends on (i.e., is based on) how the respective one of laser controllers 216 controls the tunable laser 214, as was explained above. For an example, based on how the laser controller 216_1 controls the tunable laser 214_1, the peak optical wavelength of the optical signal that the EOM_1 315 receives from the tunable laser 214_1 can be 1510 nm or 1515 nm. In response to receiving the RF carrier signal (from a respective one of the RF LOs 313), and receiving the optical signal (from a respective one of the tunable lasers 214), each EOM 315 outputs an optical signal that has been modulated to include an RF carrier signal, and thus, can be referred to as an RF modulated optical signal. The optical signal that is output by each EOM 315 is provided to one of the inputs of the WDM MUX 430, which wave division multiplexes the four optical signals it receives into a single optical signal. In accordance with certain embodiments of the present technology, the WDM DEMUX 430 may be implemented as an AWG, a ring-resonator based WDM MUX, or as an interferometer based WDM MUX, but is not limited thereto.

The WDM MUX 430 multiplexes (i.e., combines) the four RF modulated optical data signals, received from the four EOMs 315, onto a single optical fiber, with each of the four separate RF modulated optical data signals being carried at the same time on its own separate optical wavelength within a specified contiguous wavelength range (e.g., from 1510 nm to 1545 nm), or alternatively within a non-contiguous wavelength range. The signal that is output by the WDM MUX 430, which can be referred to as a wavelength division multiplexed optical signal, is provided to one of the inputs of the EOM 212, while the other input of the EOM 212 receives the data modulated RF signal (that is received at an input 404 of the switch device 402). The elements within the dashed block labeled 410 can be collectively referred to as tunable wavelength division multiplexed optical signal generator. As will be described below, for example with reference to FIG. 5B, the data modulated RF signal that is provided to the input 404 of the switch device 402 may be a frequency division multiplexed data modulated RF signal that includes data for four (or some other number of) subscriber terminals STs.

The four peak optical wavelengths of the RF modulated optical signal that the EOM 212 receives from the WDM MUX 430 depends on (i.e., is based on) how the laser controllers 216 control the tunable lasers 214, as was explained above. The optical signal that is output by the EOM 212, which can also be referred to as an optical data signal, is modulated by both the RF carrier signals that are output by the RF LOs 313 (e.g., 10.0 GHz, 10.2 GHz, 10.4 GHz and 10.6 GHz) and the RF frequency (or frequencies) of the RF data modulated signal that is received at an input 404 of the switch device 402. Thus, in this example the optical data signal output by the EOM 212 would be a wavelength division multiplexed optical signal output having multiple RF sidebands, which include mixing products of the RF frequencies produced by the RF LOs 313 and the RF frequency (or frequencies) of the data modulated RF signal provided at the input 404 of the switch device 402, which are then filtered out to select desired specific bands at the outputs 406 as described below.

In FIG. 4, each of the eight outputs of the WDM DEMUX 218 is optically coupled to a different one of the eight PDs 220_1 to 220_8. The WDM DEMUX 218 will output, at four of its eight outputs, the optical data signal that is received at its input. The specific four of the eight outputs at which the WDM DEMUX 218 will output the optical data signal (received at its input) depends on (i.e., is based on) the four peak optical wavelengths of the optical data signal provided to the EOM 212 by the WDM MUX 430. For an example, the optical data signal can be output at the WDM DEMUX 218 output coupled to either the PD 220_1 or the PD 220_2, depending upon on whether the tunable laser 214_1 was controlled to emit an optical signal having a peak optical wavelength of $\lambda 1a$ or $\lambda 1b$ (e.g., 1510 nm or 1515 nm); the optical data signal can be output at the WDM DEMUX 218 output coupled to either the PD 220_3 or the PD 220_4, depending upon on whether the tunable laser 214_2 was controlled to emit an optical signal having a peak optical wavelength of λ2a or λ2b (e.g., 1520 nm or 1525 nm); the optical data signal can be output at the WDM DEMUX 218 output coupled to either the PD 220_5 or the PD 220_6, depending upon on whether the tunable laser 214_3 was controlled to emit an optical signal having a peak optical wavelength of λ3a or λ3b (e.g., 1530 nm or 1535 nm); and the optical data signal can be output at the WDM DEMUX 218 output coupled to either the PD 220_7 or the PD 220_8, depending upon on whether the tunable laser 214_4 was controlled to emit an optical signal having a peak optical wavelength of λ4a or λ4b (e.g., 1540 nm or 1545 nm).

Each one of the four PDs 220 that receives the optical data signal from the WDM DEMUX 218 converts the optical data signal it receives from the WDM DEMUX 218 to a respective RF electrical signal, and also performs frequency conversions. The FTRs 323 (between the PDs 220 and the outputs 406 of the switch device 402) filter out the frequencies that are not of interest, such that the data modulated RF signal output at four of the eight outputs 406_1 to 406_8 of the optical switch 402 are frequency down-converted (or frequency up-converted) relative to the data modulated RF signal provided to the input 404 of the switch device.

The switch device 402 in FIG. 4 can be used to allow a segment of spectrum (e.g., a 2 GHz segment of spectrum) from an RF feeder uplink beam, transmitted from a gateway to a satellite, to be translated into four service downlink beams within a segment of spectrum allocated for RF service downlink beams (e.g., a downlink portion of the Ka band). The four user downlink beams can then be transmitted from the satellite to user terminals (which can be ground based, but are not limited thereto). Such an embodiment enables the illuminating of one user downlink beam verses another by beam hopping, where the hopping can be accomplished very rapidly by rapidly changing the control signals 408 to select different pathways. This can allow for two user downlink beams to be adjacent to one another, even if they use the same frequency band, so long as the beam hopping is performed in such a manner that adjacent user downlink beams that share the same frequency are not be turned on at the same time. Beam hopping can be performed in four sets of beam groupings since the λ1a and λ1b, λ2a and λ2b, λ3a and λ3b, and λ4a and λ4b can be switched independently.

Figure 5A:
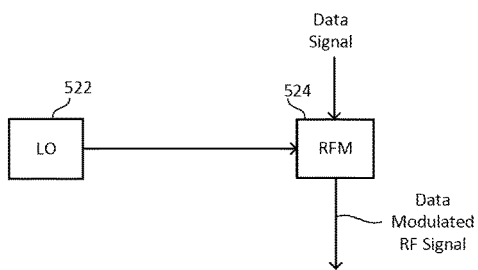
FIG. 5A depicts one way in which a gateway of a satellite communication system can produce a data modulated RF signal that can be transmitted from the gateway to a satellite via an antenna of the gateway.
Figure 5B:
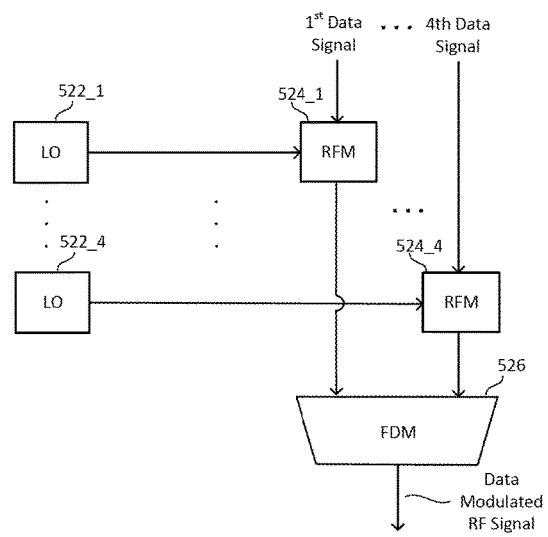
FIG. 5B illustrates how a gateway can use a frequency division multiplexer to multiplex multiple data modulated RF signals into a single signal that can be transmitted to a satellite via an antenna.

FIG. 5A depicts one way in which a gateway (e.g. 105) can produce a data modulated RF signal that can be transmitted from the gateway to a satellite (e.g., 100) via an antenna of the gateway (not shown). Referring to FIG. 5A, shown therein is a local oscillator (LO) 522 that produces an RF carrier signal. The RF carrier signal that is output by the LO 522 is provided to an RF modulator (RFM) 524, which also receives a data signal. The RFM 524 modulates that data signal onto the RF carrier signal to produce a data modulated RF signal, which can be transmitted to a satellite via an antenna. In accordance with certain embodiments, the data signal that is provided to the RFM 524 can be time division multiplexed and/or frequency division multiplexed such that the data signal (and the data modulated RF signal output from the RFM 524) includes data for multiple end users. FIG. 5B illustrates how a gateway can use a frequency division multiplexer (FDM) 526 to multiplex four data modulated RF signals into a single signal that can be transmitted to a satellite via an antenna, wherein one or more of the four data modulated RF signal may have already been time divisional multiplexed in accordance with a frequency hopping scheme. More specifically, each of four RFMs 524_1 . . . 524_4 receives a separate data signal (one or more of which may be a time multiplexed signal) and a separate RF carrier signal from a respective one of the LOs 522_1 . . . 522_4, and each of the RFMs produces a data modulated RF signal that is provided to the FDM 526, as shown in FIG. 5B. Such data modulated RF signals would likely be provided to one or more amplifiers and/or filters before being fed to an antenna and transmitted to a satellite.

Figure 6:
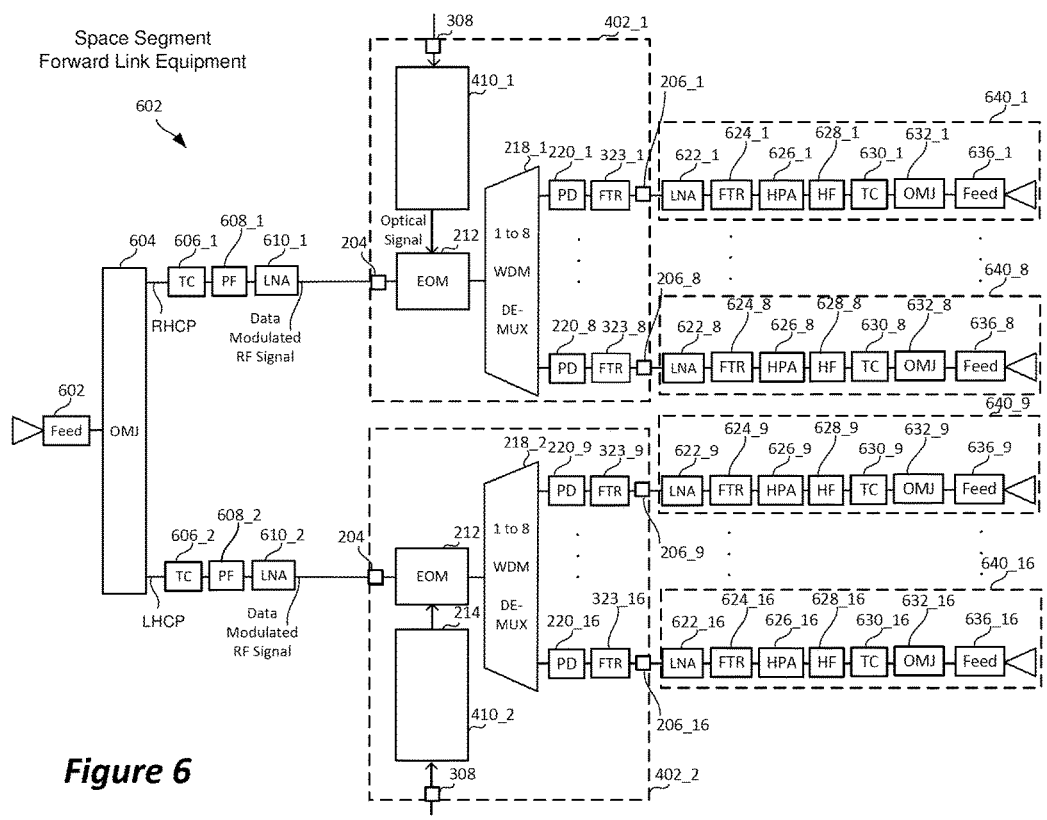
FIG. 6 illustrates how multiple instances of the switch devices introduced with reference to FIG. 4 can be included onboard a satellite, e.g., as part of a satellite space segment forward link equipment, to produce multiple separate user downlink beams based on a single feeder uplink beam received from a gateway.

FIG. 6 illustrates how multiple instances of the switch devices 402, described above with reference to FIG. 4, can be included onboard a satellite and used to produce sixteen separate user downlink beams based on a single feeder uplink beam received from a gateway. More specifically, FIG. 6 illustrates space segment forward link equipment 602, according to an embodiment of the present technology. Such space segment forward link equipment 602, which can also be referred to as a satellite subsystem 602, or more generally, as a communication subsystem, is configured to receive an RF feeder uplink beam that is transmitted from a ground based gateway (e.g., 105) to the satellite (e.g., 100) that is carrying the space segment forward link equipment 602, and produce and transmit multiple service downlink beams to service terminals STs.

Referring to FIG. 6, the space segment forward link equipment 600 is shown as including an antenna and feed horn 602, an orthomode junction (OMJ) 604, test couplers (TCs) 606_1 and 606_2, pre-select filters (PFs) 608_1 and 608_2, low noise amplifiers (LNAs) 610_1 and 160_2, switch devices 402_1 and 402_2, and sixteen output paths 640_1 . . . 640_16, which can also be referred as output channels. Each of the output paths, which can be referred to individually as an output path 640, or collectively as the output paths 640, is shown including a respective low noise amplifier (LNA) 622, filter (FTR) 624, high power amplifier (HPA) 626, test coupler (TC) 632, OMJ 632, and feed horn and antenna 636; the inclusion of the LNAs 622 may or may not be needed, depending on the gain-loss budget of the entire transponder The feed horn 602 gathers and focuses radio waves of a feeder uplink beam (e.g., 102*u*) and converts it to an RF signal that is provided to the OMJ 604. The feed horn 602 and the rest of an antenna can be collectively referred to as the antenna or antenna system. In other words, an antenna, as the term is used herein, can include a feed horn. Such an antenna can also include a reflector that is not shown in the Figure, to simplify the Figure. Assuming the feeder uplink beam received from a gateway include two orthogonal polarizations, the OMJ 604 separates the RF signal received from the the feed horn 602 into two separate RF signals. For example, one of the signals may have right hand circular polarization (RHCP) while that other has left hand circular polarization (LHCP). For another example, one of the signals may have horizontal linear polarization while the other has vertical linear polarization. Each test coupler TC 606 can be used for power monitoring, payload testing and/or performing calibrations based on signals passing therethrough. Each pre-select filter (PF) 608 (e.g., a bandpass filter) is used to remove unwanted frequency components and/or enhance desired frequency components. Each LNA 610 amplifies the relatively low-power RF signal it receives from a respective PF 608 without significantly degrading the signals signal-to-noise ratio. The amplified RF signal that is output by each LNA 610 is shown as being provided directly to a respective input 204 of one of switch device 402, but alternatively a further filter can be located between each LNA 610 and the respective switch device 402. Additional details of each of the switch devices 402 were described above with reference to FIG. 4.

As noted above, each of the output paths 640 is shown including a respective LNA 622, further FTR 624, HPA 626, TC 632, OMJ 632, and feed horn and antenna 636. Each LNA 622 amplifies the relatively low-power RF signal it receives from a respective FTR 323 without significantly degrading the signals signal-to-noise ratio. The amplified RF signal that is output by each LNA 622 is shown as being provided to a FTR 624 before being provided to a respective HPA 626, but can alternatively be provided directly to the respective HPA 626.

Each HPA 626 amplifies the RF signal it receives so that the RF signal has sufficient power to enable transmission thereof from the satellite 100 in space to a service terminal ST, which may be on the ground. Each HPA 626 can be, e.g., a liner traveling wave tube high power amplifier, but is not limited thereto. The signal that is output by each of the HPAs 626 can be referred to as an amplified RF signal. Each HF 628 is used to reduce and preferably remove any distortion in the amplified RF signal that was caused by a respective HPA 626. Each HF 628 can be, e.g., a waveguide cavity filter, but is not limited thereto. Each TC 630 can be used for power monitoring, payload testing and/or performing calibrations based on signals passing therethrough. Each OMJ 632 adds either right hand circular polarization (RHCP) or left hand circular polarization (LHCP) to the RF signal that is passed through the OMJ, or one of two other types of orthogonal polarizations, such as horizontal and vertical linear polarizations. This allows for color reuse frequency band allocation, wherein each color represents a unique combination of a frequency band and an antenna polarization. This way a pair of user downlink beams that illuminate adjacent regions can utilize a same RF frequency band at the same time, so long as they have orthogonal polarizations. Each feed horn 636 converts the RF signal it receives, from a respective OMJ 632, to radio waves and feeds them to the rest of the antenna system (not shown) to focus the signal into a service downlink beam. A feed horn 636 and the rest of an antenna can be collectively referred to as the antenna. In other words, an antenna, as the term is used herein, can include a feed horn. All or some of the feed horns 636 can share a common reflector. Such reflector(s) is/are not shown in the Figures, to simplify the Figures.

The space segment forward link described above could be used in a High Throughput Satellite (HTS) where there is a large number of small beams needed to cover (with sufficient antenna directivity) users (e.g., subscriber terminals STs) that are scattered throughout the region of interest, but there is only small amounts of traffic demand in many of the beams, while there is high traffic demand in other beams. The low demand beams can be served by beam hopping using the block diagram like the one in FIG. 6, thus reducing the satellite power needed to serve those beams, while the high demand beams may not be part of a beam hopping scheme since they require dedicated power all the time. The switching schemes described herein enable this type of power reduction in the overall system by allowing rapid beam hopping over geographically dispersed beams, and allowing them to share a limited amount of power. Other methods of switching are not as fast, so the revisit time for each beam in a hopping sequence would be higher, which leads to high latency for users in those beams.

In accordance with certain embodiments, the control signals that are provided to the control inputs 308 are provided by an onboard controller that is synchronized with a gateway so that the gateway hopping sequence would be the same as the onboard hopping sequence.

Figure 7:
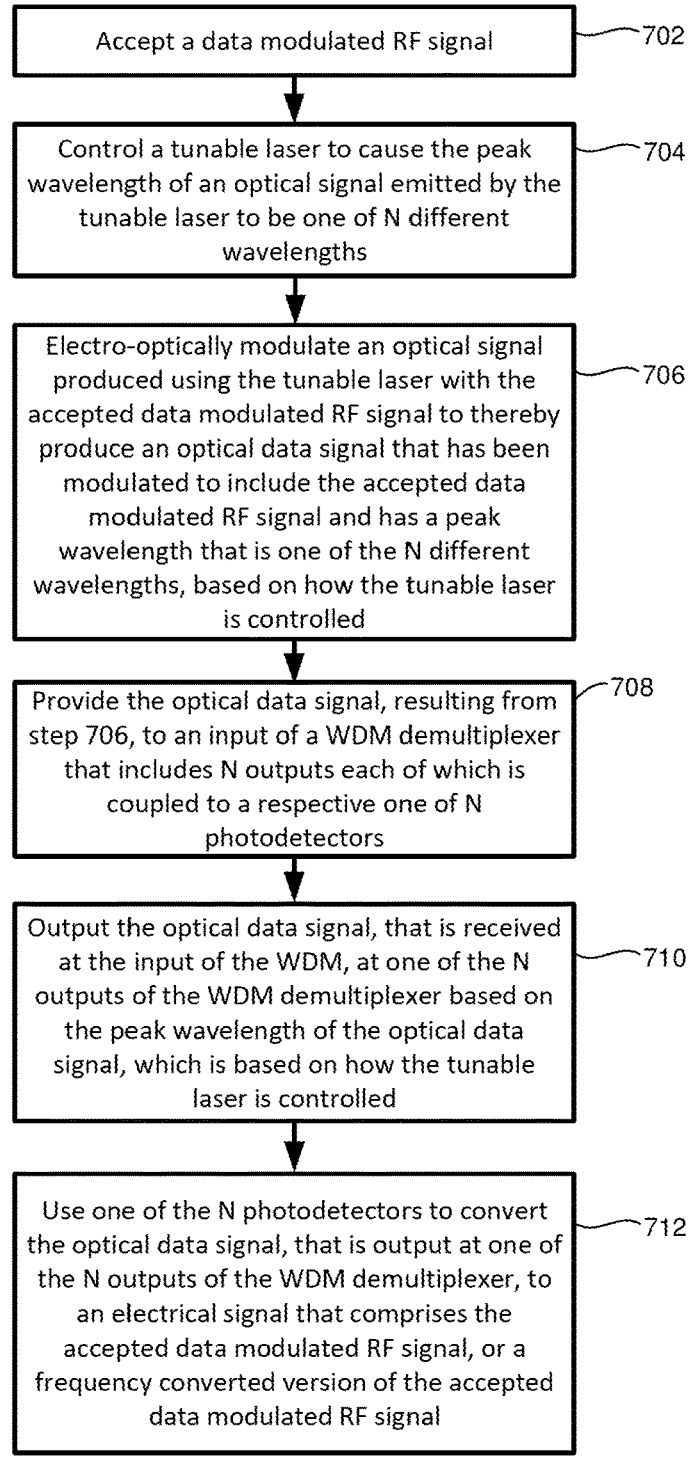
FIG. 7 is a high level flow diagram that is used to summarize methods according to certain embodiments of the present technology.

The high level flow diagram of FIG. 7 will now be used to summarize methods according to certain embodiments of the present technology. Such methods can be used for outputting an accepted data modulated RF signal, or a frequency converted version of the accepted data modulated RF signal, at one of N outputs, where N is an integer that is greater than or equal to two. Even more specifically, such methods can be used with a switch device (e.g., 202 or 302 in FIGS. 2 and 3, respectively) configured to accept a data modulated RF signal and output the data modulated RF signal, or a frequency converted version of the data modulated RF signal, at one of N outputs of the switch device, where N is an integer that is greater than or equal to two.

Referring to FIG. 7, step 702 involves accepting a data modulated RF signal, e.g., at the input 204 of the switch device 202 in FIG. 2, or at the input 304 of the switch device 302 in FIG. 3, but not limited thereto.

Step 704 involves controlling a tunable laser (e.g, 214 in FIGS. 2 and 3) to cause the peak wavelength of an optical signal emitted by the tunable laser to be one of N different wavelengths, where N is an integer that is greater than or equal to two. In accordance with certain embodiments, step 704 can be performed by the laser controller 216 discussed above, e.g., with reference to FIGS. 2 and 3. The order of steps 702 and 704 can be reversed, or steps 702 and 704 can be performed simultaneously.

Step 706 involves electro-optically modulating an optical signal produced using the tunable laser with the accepted data modulated RF signal to thereby produce an optical data signal that has been modulated to include the accepted data modulated RF signal and has a peak wavelength that is one of the N different wavelengths, based on how the tunable laser is controlled.

Step 708 involves providing the optical data signal, resulting from the electro-optically modulating, to an input of a wavelength-division multiplexing (WDM) demultiplexer (e.g., 218 in FIGS. 2 and 3) that includes N outputs each of which is coupled to a respective one of N photodetectors (e.g., 220 in FIGS. 2 and 3).

Step 710 involves outputting the optical data signal, that is received at the input of the WDM, at one of the N outputs of the WDM demultiplexer based on the peak wavelength of the optical data signal, which is based on how the tunable laser is controlled at step 704

Step 712 involves using one of the N photodetectors (e.g., 220 in FIGS. 2 and 3) to convert the optical data signal, that is output at one of the N outputs of the WDM demultiplexer, to an electrical signal that comprises the accepted data modulated RF signal, or a frequency converted version of the accepted data modulated RF signal.

In accordance with certain embodiments, each of the N photodetectors (e.g., 220 in FIGS. 2 and 3) is coupled to a respective one of N communication nodes of a communication system. In such embodiments, such a method can be used to selectively provide the accepted data modulated RF signal, or a frequency converted version of the accepted data modulated RF signal, to one of the N communication nodes of the communication system without performing digital switching.

In accordance with certain embodiments, a method can also include using a local oscillator (LO) (e.g., 313 in FIG. 3) to produce a radio frequency (RF) signal, and electro-optically modulating (e.g., using the EOM 315 in FIG. 3) the optical signal having the peak wavelength emitted by the tunable laser (e.g., 214 in FIG. 3) with the RF signal produced using the LO to thereby produce an RF modulated optical signal, wherein a peak wavelength of the RF modulated optical signal is one of the N different wavelengths, based on how the controller controls the tunable laser. In such an embodiment, the RF modulated optical signal (e.g., output by the EOM 315 in FIG. 3), which has the peak wavelength based on how the controller (e.g., 216 in FIG. 3) controls the tunable laser (e.g., 214 in FIG. 3), can be the optical signal produced using the tunable laser that is electro-optically modulated with the accepted data modulated RF signal at step 706 to thereby produce the optical data signal that is provided to the input of the WDM demultiplexer at step 708. Additionally, in such an embodiment, use of the LO (e.g., 313 in FIG. 3) to produce the RF signal and the electro-optically modulating the optical signal having the peak wavelength emitted by the tunable laser with the RF signal produced using the LO to thereby produce the RF modulated optical signal causes the data modulated RF signal, that is output by one of the N photodetectors based on how the controller controls the tunable laser, to be frequency converted compared to the accepted data modulated RF signal, as was explained above with reference to FIG. 3.

The methods described above with reference to FIG. 7 can be used on a satellite to perform beam hopping. Still referring to FIG. 7, in accordance with certain embodiments, the data modulated RF signal accepted at step 702 can be produced on a satellite based on a feeder beam received by the satellite from a gateway, and the data modulated RF signal (or the frequency converted version thereof) that is output by one of the N photodetectors at step 710 can be used to produce a service beam that is transmitted by the satellite to one or more subscriber terminals STs.

Figure 8:
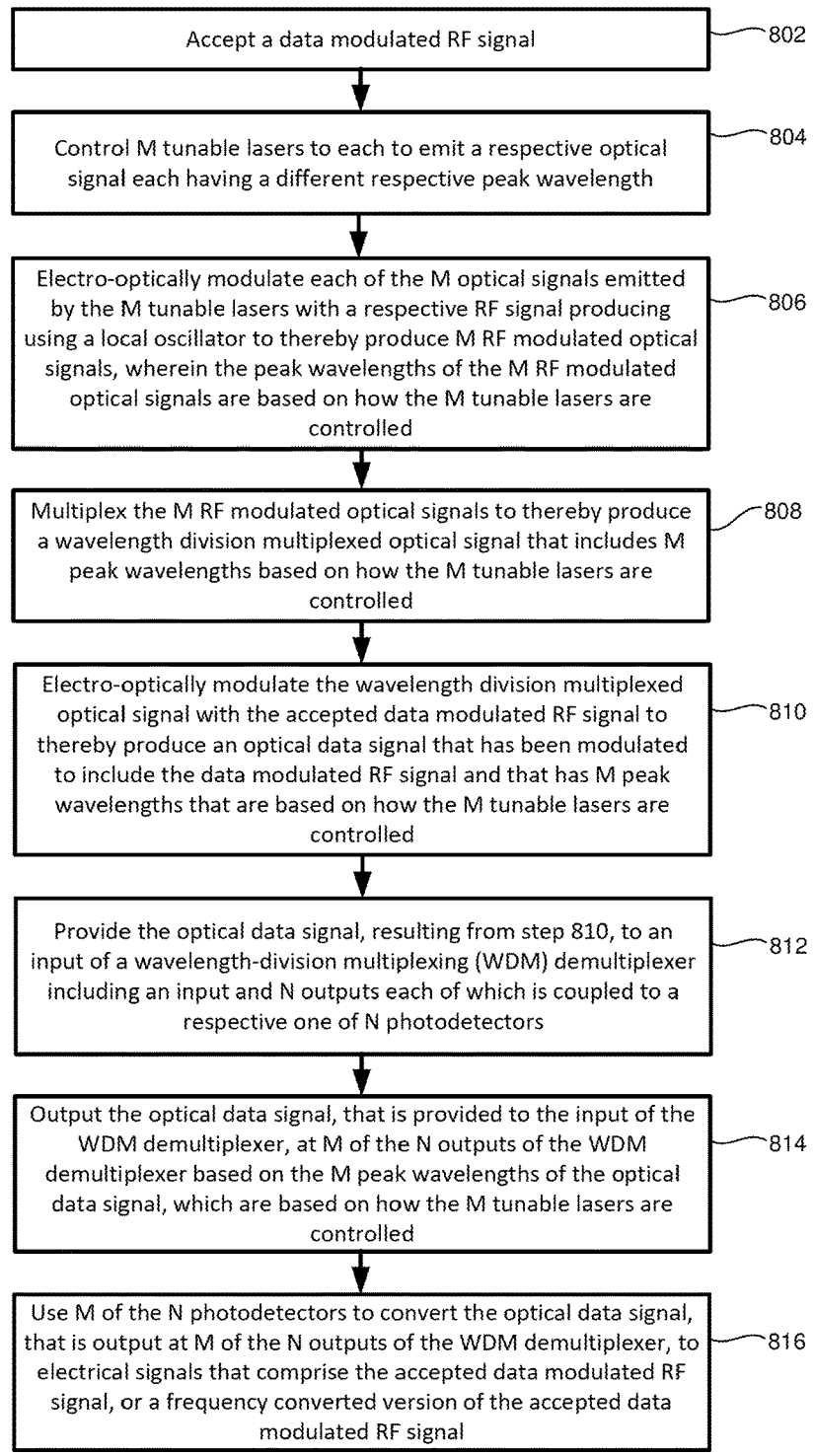
FIG. 8 is a high level flow diagram that is used to summarize methods according to certain other embodiments of the present technology.

The high level flow diagram of FIG. 8 will now be used to summarize methods according to certain embodiments of the present technology. Such methods can be used for outputting an accepted data modulated RF signal, or a frequency converted version of the accepted data modulated RF signal, at M of N outputs, where M is an integer that is greater than or equal to two, and N is an integer that is greater than M. Even more specifically, such methods can be used with a switch device (e.g., 402 in FIG. 4) configured to accept a data modulated RF signal and output the data modulated RF signal, or a frequency converted version of the data modulated RF signal, at M of N outputs of the switch device, where M is an integer that is greater than or equal to two, and N is an integer that greater than M.

Referring to FIG. 8, step 802 involves accepting a data modulated RF signal. For example, step 802 can involve accepted a data modulated RF signal at the input 404 of the switch device 402 in FIG. 4, but not limited thereto. The order of steps 802 and 804 can be reversed, or steps 802 and 804 can be performed simultaneously.

Step 804 involves controlling M tunable lasers to each to emit a respective optical signal each having a different respective peak wavelength, where M is an integer that is greater than or equal to two. In accordance with certain embodiments, step 804 can be performed by the laser controllers 216 discussed above with reference to FIG. 4. As was explained above, it would also be possible for a single laser controller 216 to control multiple tunable lasers (e.g., 214 in FIG. 4).

Step 806 involves electro-optically modulating each of the M optical signals emitted by the M tunable lasers with a respective radio frequency (RF) signal producing using a local oscillator (LO) (e.g., 313 in FIG. 4) to thereby produce M separated RF modulated optical signals, wherein the peak wavelengths of the M RF modulated optical signals are based on how the one or more controllers (e.g., 216) control the M tunable lasers (e.g., 214).

Step 808 involves multiplexing the M separate RF modulated optical signals to thereby produce a wavelength division multiplexed optical signal that includes M peak wavelengths based on how the M tunable lasers are controlled at step 804. In accordance with certain embodiments, the multiplexing performed at step 808 can be performed using the WDM MUX 430 shown in FIG. 4, but is not limited thereto.

Step 810 involves electro-optically modulating the wavelength division multiplexed optical signal with the accepted data modulated RF signal to thereby produce an optical data signal that has been modulated to include the data modulated RF signal and that has M peak wavelengths that are based on how the one or more controllers control the M tunable lasers. In accordance with certain embodiment, the electro-optically modulating performed at step 810 can be performed using the EOM 212 in FIG. 4.

Step 812 involves providing the optical data signal, resulting from step 810, to an input of a wavelength-division multiplexing (WDM) demultiplexer (e.g., 218 in FIG. 4) including an input and N outputs each of which is coupled to a respective one of N photodetectors (e.g., 220 in FIG. 4), where N is an integer that greater than M.

Step 814 involves outputting the optical data signal, that is provided to the input of the WDM demultiplexer, at M of the N outputs of the WDM demultiplexer (e.g., 218 in FIG. 4) based on the M peak wavelengths of the optical data signal, which are based on how the one or more controllers (e.g., 216 in FIG. 4) control the M tunable lasers (e.g., 214 in FIG. 4).

Step 816 involves using M of the N photodetectors (e.g., four of the eight PDs 220 in FIG. 4) to convert the optical data signal, that is output at M of the N outputs of the WDM demultiplexer (e.g., 218 in FIG. 4), to electrical signals that comprise the accepted data modulated RF signal, or a frequency converted version of the accepted data modulated RF signal.

In accordance with certain embodiments, the data modulated RF signal accepted at step 802 is a frequency division multiplexed signal that includes data for multiple end users. FIG. 5B explain how such a frequency division multiplexed signal can be produced.

In accordance with certain embodiments, the methods summarized with reference to FIG. 8 can be used on a satellite to perform beam hopping.

In accordance with certain embodiments, the data modulated RF signal accepted at step 802 is produced based on a feeder beam received by the satellite from a gateway, and the data modulated RF signal or the frequency converted version thereof that is output by M of the N photodetectors at step 816 is used to produced a service beam that is transmitted by the satellite to one or more subscriber terminals. Exemplary equipment that can be used to perform such steps were described above with reference to FIG. 6.

Certain embodiments of the present technology are directed to a switch device configured to accept a data modulated RF signal and output the data modulated RF signal, or a frequency converted version of the data modulated RF signal, at one of N outputs of the switch device, where N is an integer that is greater than or equal to two. The switch device includes a tunable laser, a controller, an electro-optical modulator (EOM), a wavelength-division multiplexing (WDM) demultiplexer, and N photodetectors (PDs). The tunable laser is operable to emit an optical signal having a peak wavelength. The controller is configured to control the tunable laser to cause the peak wavelength of the optical signal emitted by the tunable laser to be one of N different wavelengths. The EOM includes a first input configured to receive the data modulated RF signal accepted by the switch device, a second input configured to receive an optical signal produced using the tunable laser, and an output configured to output an optical data signal that has been modulated to include the data modulated RF signal, wherein a peak wavelength of the optical data signal that is output by the EOM is one of the N different wavelengths, based on how the controller controls the tunable laser. The WDM demultiplexer includes an input and N outputs, wherein the input of the WDM demultiplexer is configured to receive the optical data signal that is output by the EOM, and wherein at any given time the optical data signal that is received at the input of the WDM demultiplexer will be output at one of the N outputs of the WDM demultiplexer based on the peak wavelength of the optical data signal, which is based on how the controller controls the tunable laser. Each of the N PDs is optically coupled to a respective one of the N outputs of the WDM demultiplexer, and each of the N PDs provides or is electrically coupled to one of the N outputs of the switch device. At any given time, the data modulated RF signal that is accepted by the switch device, or a frequency converted version of the data modulated RF signal that is accepted by the switch device, will be output by one of the N photodetectors based on how the controller controls the tunable laser.

In accordance with certain embodiments, each of the N photodetectors, which is optically coupled to a respective one of the N outputs of the WDM demultiplexer, is configured to convert an optical signal received from a respective one of the N outputs of the WDM demultiplexer to an electrical signal. At any given time, the electrical signal produced by one of the N photodetectors comprises the data modulated RF signal that is accepted by the switch device, or a frequency converted version of the data modulated RF signal that is accepted by the switch device.

In accordance with certain embodiments, by electrically coupling each of the N photodetectors to a respective one of N communication nodes of a communication system, the switch device can be used to selectively provide the data modulated RF signal, or a frequency converted version of the data modulated RF signal that is accepted by the switch device, to one of the N communication nodes of the communication system without performing digital switching.

In accordance with certain embodiments, the switch device further includes a local oscillator (LO and a further EOM. The LO is configured to output a radio frequency (RF) signal. The further EOM includes a first input configured to receive the optical signal having the peak wavelength emitted by the tunable laser, a second input configured to receive the RF signal output by the LO, and an output configured to output an RF modulated optical signal. A peak wavelength of the RF modulated optical signal that is output by the further EOM is one of the N different wavelengths, based on how the controller controls the tunable laser. The RF modulated optical signal that is output by the further EOM is provided to the first input of the EOM and is used to cause a data modulated RF signal, that is output by one of the N photodetectors based on how the controller controls the tunable laser, to be frequency converted compared to the data modulated RF signal that is accepted by the switch device.

In accordance with certain embodiments, the switch device is configured to be included on a satellite and is used to enable the satellite to perform beam hopping. In accordance with certain embodiments, the data modulated RF signal accepted from the switch device is produced based on a feeder beam received by the satellite from a gateway, and the data modulated RF signal or the frequency converted version thereof that is output by one of the N photodetectors of the switch device is used to produced a service beam that is transmitted by the satellite to one or more subscriber terminals.

Certain embodiment of the present technology are directed to a method that includes accepting a data modulated RF signal, controlling a tunable laser to cause a peak wavelength of an optical signal emitted by the tunable laser to be one of N different wavelengths (where N is an integer that is greater than or equal to two), and electro-optically modulating an optical signal produced using the tunable laser with the accepted data modulated RF signal to thereby produce an optical data signal that has been modulated to include the accepted data modulated RF signal and has a peak wavelength that is one of the N different wavelengths, based on how the tunable laser is controlled. The method also includes providing the optical data signal, resulting from the electro-optically modulating, to an input of a wavelength-division multiplexing (WDM) demultiplexer that includes N outputs each of which is coupled to a respective one of N photodetectors. The method further includes outputting the optical data signal, that is received at the input of the WDM, at one of the N outputs of the WDM demultiplexer based on the peak wavelength of the optical data signal, which is based on how the tunable laser is controlled, and using one of the N photodetectors to convert the optical data signal, that is output at one of the N outputs of the WDM demultiplexer, to an electrical signal that comprises the accepted data modulated RF signal, or a frequency converted version of the accepted data modulated RF signal.

In accordance with certain embodiments, each of the N photodetectors is coupled to a respective one of N communication nodes of a communication system, and the method is used to selectively provide the accepted data modulated RF signal, or a frequency converted version of the accepted data modulated RF signal, to one of the N communication nodes of the communication system without performing digital switching.

In accordance with certain embodiments, the method further includes using a local oscillator to produce a radio frequency (RF) signal, and electro-optically modulating the optical signal having the peak wavelength emitted by the tunable laser with the RF signal produced using the LO to thereby produce an RF modulated optical signal, wherein a peak wavelength of the RF modulated optical signal is one of the N different wavelengths, based on how the the tunable laser is controlled. The RF modulated optical signal, which has the peak wavelength based on how the tunable laser is controlled, comprises the optical signal produced using the tunable laser that is electro-optically modulated with the accepted data modulated RF signal to thereby produce the optical data signal that is provided to the input of the WDM demultiplexer. The using of the LO to produce the RF signal and the electro-optically modulating the optical signal having the peak wavelength emitted by the tunable laser with the RF signal produced using the LO to thereby produce the RF modulated optical signal causes the data modulated RF signal, that is output by one of the N photodetectors based on how the tunable laser is controlled, to be frequency converted compared to the accepted data modulated RF signal.

In accordance with certain embodiments, the method is used on a satellite to perform beam hopping.

In accordance with certain embodiments, the accepted data modulated RF signal is produced on a satellite based on a feeder beam received by the satellite from a gateway, and the data modulated RF signal or the frequency converted version thereof that is output by one of the N photodetectors is used to produce a service beam that is transmitted by the satellite to one or more subscriber terminals.

Certain embodiments of the present technology are directed to a switch device configured to accept a data modulated RF signal and output the data modulated RF signal, or a frequency converted version of the data modulated RF signal, at M of N outputs of the switch device, where M is an integer that is greater than or equal to two, and N is an integer that greater than M. The switch device includes M tunable lasers, one or more controllers, M electro-optical modulators (EOMs), an M:1 wavelength division multiplexing (WDM) multiplexer, a further EOM, a wavelength-division multiplexing (WDM) demultiplexer, and N photodetectors. The M tunable lasers are each operable to emit an optical signal having a peak wavelength. The one or more controllers is/are configured to control the tunable lasers to cause the peak wavelength of the optical signal emitted by each of the tunable laser to be one of a plurality of different wavelengths. The M EOMs each include a first input configured to receive the optical signal having the peak wavelength emitted by a respective one of the tunable lasers, a second input configured to receive an RF signal produced using a local oscillator, and an output configured to output one of M RF modulated optical signals, wherein the peak wavelengths of the M RF modulated optical signals that are output by the M EOMs are based on how the one or more controllers control the M tunable lasers. The M:1 WDM multiplexer is configured to receive the M RF modulated optical signals that are output by the M EOMs and combine M RF modulated optical signals into a wavelength division multiplexed optical signal. The further EOM includes a first input configured to receive the data modulated RF signal accepted by the switch device, a second input configured to receive the wavelength division multiplexed optical signal produced by the M:1 WDM multiplexer, and an output configured to output an optical data signal that has been modulated to include the data modulated RF signal, wherein M peak wavelengths of the optical data signal that is output by the further EOM are based on how the one or more controllers control the M tunable lasers. The WDM demultiplexer includes an input and N outputs, wherein the input of the WDM demultiplexer is configured to receive the optical data signal that is output by the further EOM, and wherein at any given time the optical data signal that is received at the input of the WDM demultiplexer will be output at M of the N outputs of the WDM demultiplexer based on the M peak wavelengths of the optical data signal, which are based on how the one or more controllers control the M tunable lasers. Each of N photodetectors is optically coupled to a respective one of the N outputs of the WDM demultiplexer, and each of of the N photodetectors provides or is electrically coupled to one of the N outputs of the switch device. At any given time the data modulated RF signal that is accepted by the switch device, or a frequency converted version of the data modulated RF signal that is accepted by the switch device, will be output by M of the N photodetectors based on how the one or more controllers control the M tunable lasers.

In accordance with certain embodiments, the data modulated RF signal accepted by the switch device comprises a frequency division multiplexed signal that includes data for multiple end users.

In accordance with certain embodiments, the switch device is configured to be included on a satellite and is used to enable the satellite to perform beam hopping.

In accordance with certain embodiments, the data modulated RF signal accepted from the switch device is produced based on a feeder beam received by a satellite from a gateway, and the data modulated RF signal or the frequency converted version thereof that is output by one of the N photodetectors of the switch device is used to produced a service beam that is transmitted by the satellite to one or more subscriber terminals.

A method according to certain embodiments includes accepting a data modulated RF signal, and controlling M tunable lasers to each to emit a respective optical signal each having a different respective peak wavelength, where M is an integer that is greater than or equal to two. The method also includes electro-optically modulating each of the M optical signals emitted by the M tunable lasers with a respective radio frequency (RF) signal producing using a local oscillator to thereby produce M RF modulated optical signals, wherein the peak wavelengths of the M RF modulated optical signals are based on how the M tunable lasers are controlled. The method further includes multiplexing the M RF modulated optical signals to thereby produce a wavelength division multiplexed optical signal that includes M peak wavelengths based on how the one or more controllers control the M tunable lasers. Additionally, the method includes electro-optically modulating the wavelength division multiplexed optical signal with the accepted data modulated RF signal to thereby produce an optical data signal that has been modulated to include the data modulated RF signal and that has M peak wavelengths that are based on how the one or more controllers control the M tunable lasers. The method also includes providing the optical data signal, resulting from the electro-optically modulating the wavelength division multiplexed optical signal with the accepted data modulated RF signal, to an input of a wavelength-division multiplexing (WDM) demultiplexer including an input and N outputs each of which is coupled to a respective one of N photodetectors, where N is an integer that greater than M. The method further includes outputting the optical data signal, that is provided to the input of the WDM demultiplexer, at M of the N outputs of the WDM demultiplexer based on the M peak wavelengths of the optical data signal, which are based on how the one or more controllers control the M tunable lasers. Additionally, the method includes using M of the N photodetectors to convert the optical data signal, that is output at M of the N outputs of the WDM demultiplexer, to electrical signals that comprise the accepted data modulated RF signal, or a frequency converted version of the accepted data modulated RF signal.

In accordance with certain embodiments, the accepted data modulated RF signal is at least one of frequency division multiplexed or time divisional multiplexed so that the accepted data modulated RF signal includes data for multiple end users.

In accordance with certain embodiments, the method is used on a satellite to perform beam hopping.

In accordance with certain embodiments, the accepted data modulated RF signal is produced based on a feeder beam received by a satellite from a gateway, and the data modulated RF signal or the frequency converted version thereof that is output by M of the N photodetectors is used to produced a service beam that is transmitted by the satellite to one or more subscriber terminals.

Embodiments of the present invention have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed invention. For example, it would be possible to combine or separate some of the steps shown in FIGS. 7 and 8. For another example, it is possible to change the boundaries of some of the dashed blocks shown in FIG. 6.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A switch device configured to accept a data modulated RF signal and output the data modulated RF signal, or a frequency converted version of the data modulated RF signal, at only one of N outputs of the switch device at any given time, where N is an integer that is greater than or equal to two, the switch device comprising:
    a tunable laser operable to emit an optical signal having a peak wavelength;
    a controller configured to control the tunable laser to cause the peak wavelength of the optical signal emitted by the tunable laser to be one of N different wavelengths;
    an electro-optical modulator (EOM) including
        a first input configured to receive the data modulated RF signal accepted by the switch device,
        a second input configured to receive an optical signal produced using the tunable laser, and
        an output configured to output an optical data signal that has been modulated to include the data modulated RF signal,
        wherein a peak wavelength of the optical data signal that is output by the EOM is one of the N different wavelengths, based on how the controller controls the tunable laser;
    a wavelength-division multiplexing (WDM) demultiplexer including an input and N outputs,
        wherein the input of the WDM demultiplexer is configured to receive the optical data signal that is output by the EOM, and
        wherein at any given time the optical data signal that is received at the input of the WDM demultiplexer will be output at only one of the N outputs of the WDM demultiplexer based on the peak wavelength of the optical data signal, which is based on how the controller controls the tunable laser; and
    N photodetectors, each of which is optically coupled to a respective one of the N outputs of the WDM demultiplexer, and each of which provides or is electrically coupled to one of the N outputs of the switch device;
    wherein at any given time the data modulated RF signal that is accepted by the switch device, or a frequency converted version of the data modulated RF signal that is accepted by the switch device, will be output by only one of the N photodetectors based on how the controller controls the tunable laser.

2. The switch device of claim 1, wherein each of the N photodetectors, which is optically coupled to a respective one of the N outputs of the WDM demultiplexer, is configured to convert an optical signal received from a respective one of the N outputs of the WDM demultiplexer to an electrical signal.

3. The switch device of claim 2, wherein at any given time the electrical signal produced by only one of the N photodetectors comprises the data modulated RF signal that is accepted by the switch device, or a frequency converted version of the data modulated RF signal that is accepted by the switch device.

4. The switch device of claim 1, wherein by electrically coupling each of the N photodetectors to a respective one of N communication nodes of a communication system, the switch device can be used to selectively provide the data modulated RF signal, or a frequency converted version of the data modulated RF signal that is accepted by the switch device, to only one of the N communication nodes of the communication system at any given time without performing digital switching.

5. The switch device of claim 1, further comprising:
    a local oscillator (LO) configured to output a radio frequency (RF) signal;
    a further electro-optical modulator (EOM) including
        a first input configured to receive the optical signal having the peak wavelength emitted by the tunable laser,
        a second input configured to receive the RF signal output by the LO, and
        an output configured to output an RF modulated optical signal;
        wherein a peak wavelength of the RF modulated optical signal that is output by the further EOM is one of the N different wavelengths, based on how the controller controls the tunable laser;
    wherein the RF modulated optical signal that is output by the further EOM is provided to the first input of the EOM and is used to cause a data modulated RF signal, that is output at any given time by only one of the N photodetectors based on how the controller controls the tunable laser, to be frequency converted compared to the data modulated RF signal that is accepted by the switch device.

6. The switch device of claim 1, wherein the switch device is configured to be included on a satellite and is used to enable the satellite to perform beam hopping.

7. The switch device of claim 6, wherein:
    the data modulated RF signal accepted from the switch device is produced based on a feeder beam received by the satellite from a gateway; and
    the data modulated RF signal or the frequency converted version thereof that is output at any given time by only one of the N photodetectors of the switch device is used to produced a service beam that is transmitted by the satellite to one or more subscriber terminals.

8. A method comprising:
    accepting a data modulated RF signal;
    controlling a tunable laser to cause a peak wavelength of an optical signal emitted by the tunable laser to be one of N different wavelengths, where N is an integer that is greater than or equal to two;
electro-optically modulating an optical signal produced using the tunable laser with the accepted data modulated RF signal to thereby produce an optical data signal that has been modulated to include the accepted data modulated RF signal and has a peak wavelength that is one of the N different wavelengths, based on how the tunable laser is controlled;
providing the optical data signal, resulting from the electro-optically modulating, to an input of a wavelength-division multiplexing (WDM) demultiplexer that includes N outputs each of which is coupled to a respective one of N photodetectors;
at any given time outputting the optical data signal, that is received at the input of the WDM, at only one of the N outputs of the WDM demultiplexer based on the peak wavelength of the optical data signal, which is based on how the tunable laser is controlled; and
at any given time using only one of the N photodetectors to convert the optical data signal, that is output at only one of the N outputs of the WDM demultiplexer, to an electrical signal that comprises the accepted data modulated RF signal, or a frequency converted version of the accepted data modulated RF signal.

9. The method of claim 8, wherein each of the N photodetectors is coupled to a respective one of N communication nodes of a communication system, and wherein the method is used to selectively provide the accepted data modulated RF signal, or a frequency converted version of the accepted data modulated RF signal, to only one of the N communication nodes of the communication system at any given time without performing digital switching.

10. The method of claim 8, further comprising:
using a local oscillator to produce a radio frequency (RF) signal;
electro-optically modulating the optical signal having the peak wavelength emitted by the tunable laser with the RF signal produced using the LO to thereby produce an RF modulated optical signal, wherein a peak wavelength of the RF modulated optical signal at any given time is only one of the N different wavelengths, based on how the tunable laser is controlled;
wherein the RF modulated optical signal, which has the peak wavelength based on how the tunable laser is controlled, comprises the optical signal produced using the tunable laser that is electro-optically modulated with the accepted data modulated RF signal to thereby produce the optical data signal that is provided to the input of the WDM demultiplexer; and
wherein the using of the LO to produce the RF signal and the electro-optically modulating the optical signal having the peak wavelength emitted by the tunable laser with the RF signal produced using the LO to thereby produce the RF modulated optical signal causes the data modulated RF signal, that is output at any given time by only one of the N photodetectors based on how the tunable laser is controlled, to be frequency converted compared to the accepted data modulated RF signal.

11. The method of claim 8, further comprising using the method on a satellite to perform beam hopping.

12. The method of claim 8, wherein:
the accepted data modulated RF signal is produced on a satellite based on a feeder beam received by the satellite from a gateway; and
the data modulated RF signal or the frequency converted version thereof that is output at any given time by only one of the N photodetectors is used to produce a service beam that is transmitted by the satellite to one or more subscriber terminals.

13. A switch device configured to accept a data modulated RF signal and output the data modulated RF signal, or a frequency converted version of the data modulated RF signal, at M of N outputs of the switch device, where M is an integer that is greater than or equal to two, and N is an integer that greater than M, the switch device comprising:
M tunable lasers each operable to emit an optical signal having a peak wavelength;
one or more controllers configured to control the tunable lasers to cause the peak wavelength of the optical signal emitted by each of the tunable laser to be one of a plurality of different wavelengths;
M electro-optical modulators (EOMs) each including
a first input configured to receive the optical signal having the peak wavelength emitted by a respective one of the tunable lasers,
a second input configured to receive an RF signal produced using a local oscillator, and
an output configured to output one of M RF modulated optical signals, wherein the peak wavelengths of the M RF modulated optical signals that are output by the M EOMs are based on how the one or more controllers control the M tunable lasers;
an M:1 wavelength division multiplexing (WDM) multiplexer configured to receive the M RF modulated optical signals that are output by the M EOMs and combine M RF modulated optical signals into a wavelength division multiplexed optical signal;
a further EOM including
a first input configured to receive the data modulated RF signal accepted by the switch device,
a second input configured to receive the wavelength division multiplexed optical signal produced by the M:1 WDM multiplexer, and
an output configured to output an optical data signal that has been modulated to include the data modulated RF signal,
wherein M peak wavelengths of the optical data signal that is output by the further EOM are based on how the one or more controllers control the M tunable lasers;
a wavelength-division multiplexing (WDM) demultiplexer including an input and N outputs,
wherein the input of the WDM demultiplexer is configured to receive the optical data signal that is output by the further EOM, and
wherein at any given time the optical data signal that is received at the input of the WDM demultiplexer will be output at M of the N outputs of the WDM demultiplexer based on the M peak wavelengths of the optical data signal, which are based on how the one or more controllers control the M tunable lasers; and
N photodetectors, each of which is optically coupled to a respective one of the N outputs of the WDM demultiplexer, and each of which provides or is electrically coupled to one of the N outputs of the switch device;
wherein at any given time the data modulated RF signal that is accepted by the switch device, or a frequency converted version of the data modulated RF signal that is accepted by the switch device, will be output by M of the N photodetectors based on how the one or more controllers control the M tunable lasers.

14. The switch device of claim 13, wherein the data modulated RF signal accepted by the switch device comprises a frequency division multiplexed signal that includes data for multiple end users.

15. The switch device of claim 13, wherein the switch device is configured to be included on a satellite and is used to enable the satellite to perform beam hopping.

16. The switch device of claim 13, wherein:
the data modulated RF signal accepted from the switch device is produced based on a feeder beam received by a satellite from a gateway; and
the data modulated RF signal or the frequency converted version thereof that is output by one of the N photodetectors of the switch device is used to produced a service beam that is transmitted by the satellite to one or more subscriber terminals.

17. A method comprising:
accepting a data modulated RF signal;
controlling M tunable lasers to each to emit a respective optical signal each having a different respective peak wavelength, where M is an integer that is greater than or equal to two;
electro-optically modulating each of the M optical signals emitted by the M tunable lasers with a respective radio frequency (RF) signal producing using a local oscillator to thereby produce M RF modulated optical signals, wherein the peak wavelengths of the M RF modulated optical signals are based on how the M tunable lasers are controlled;
multiplexing the M RF modulated optical signals to thereby produce a wavelength division multiplexed optical signal that includes M peak wavelengths based on how the one or more controllers control the M tunable lasers;
electro-optically modulating the wavelength division multiplexed optical signal with the accepted data modulated RF signal to thereby produce an optical data signal that has been modulated to include the data modulated RF signal and that has M peak wavelengths that are based on how the one or more controllers control the M tunable lasers;
providing the optical data signal, resulting from the electro-optically modulating the wavelength division multiplexed optical signal with the accepted data modulated RF signal, to an input of a wavelength-division multiplexing (WDM) demultiplexer including an input and N outputs each of which is coupled to a respective one of N photodetectors, where N is an integer that greater than M;
outputting the optical data signal, that is provided to the input of the WDM demultiplexer, at M of the N outputs of the WDM demultiplexer based on the M peak wavelengths of the optical data signal, which are based on how the one or more controllers control the M tunable lasers; and
using M of the N photodetectors to convert the optical data signal, that is output at M of the N outputs of the WDM demultiplexer, to electrical signals that comprise the accepted data modulated RF signal, or a frequency converted version of the accepted data modulated RF signal.

18. The method of claim 17, wherein the accepted data modulated RF signal is at least one of frequency division multiplexed or time divisional multiplexed so that the accepted data modulated RF signal includes data for multiple end users.

19. The method of claim 17, further comprising using the method on a satellite to perform beam hopping.

20. The method of claim 17, wherein:
the accepted data modulated RF signal is produced based on a feeder beam received by a satellite from a gateway; and
the data modulated RF signal or the frequency converted version thereof that is output by M of the N photodetectors is used to produced a service beam that is transmitted by the satellite to one or more subscriber terminals.

* * * * *

UNITED STATES PATENT AND TRADEMARK OFFICE
CERTIFICATE OF CORRECTION

PATENT NO. : 10,250,330 B1
APPLICATION NO. : 15/904063
DATED : April 2, 2019
INVENTOR(S) : Cabello et al.

Page 1 of 1

It is certified that error appears in the above-identified patent and that said Letters Patent is hereby corrected as shown below:

In the Claims

Column 24, Line 62 (Claim 7): After "to" and before "a" delete "produced" and insert -- produce --

Column 26, Line 11 (Claim 13): After "that" and before "greater" insert -- is --

Column 26, Line 16 (Claim 13): After "to" and before "one" delete "be"

Column 27, Line 16 (Claim 16): After "to" and before "a" delete "produced" and insert -- produce --

Column 27, Line 21 (Claim 17): After "each" and before "emit" delete "to"

Column 28, Lines 10-11 (Claim 17): After "that" and before "greater" insert -- is --

Column 28, Line 37 (Claim 20): After "to" and before "a" delete "produced" and insert -- produce --

Signed and Sealed this
Seventh Day of April, 2020

Andrei Iancu
*Director of the United States Patent and Trademark Office*